T. SANGIULIANO.
NUT BLANCHING MACHINE.
APPLICATION FILED DEC. 28, 1920.
1,393,168.
Patented Oct. 11, 1921.
3 SHEETS—SHEET 1.
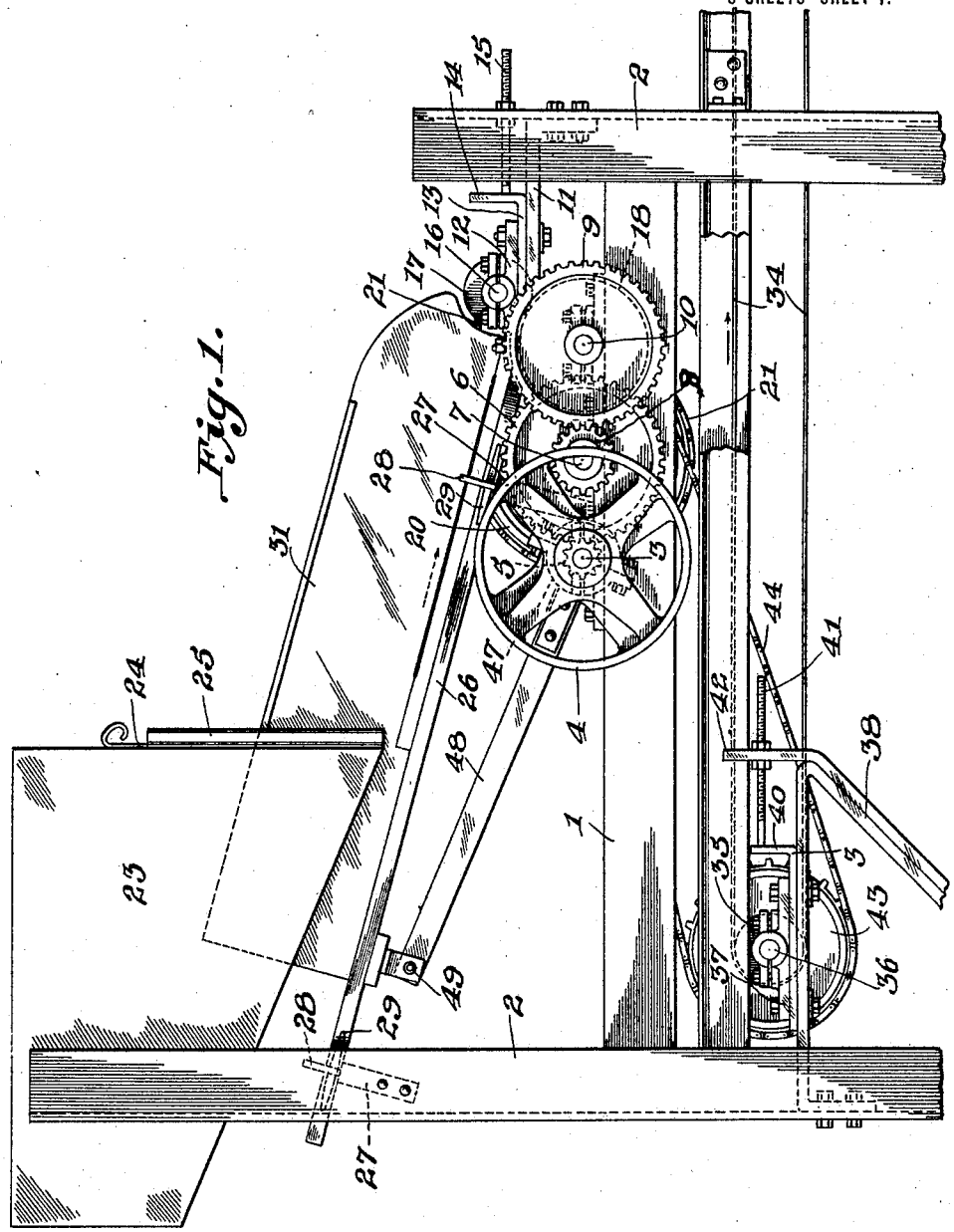
Inventor
Thomas Sangiuliano
By [signature],
Attorneys

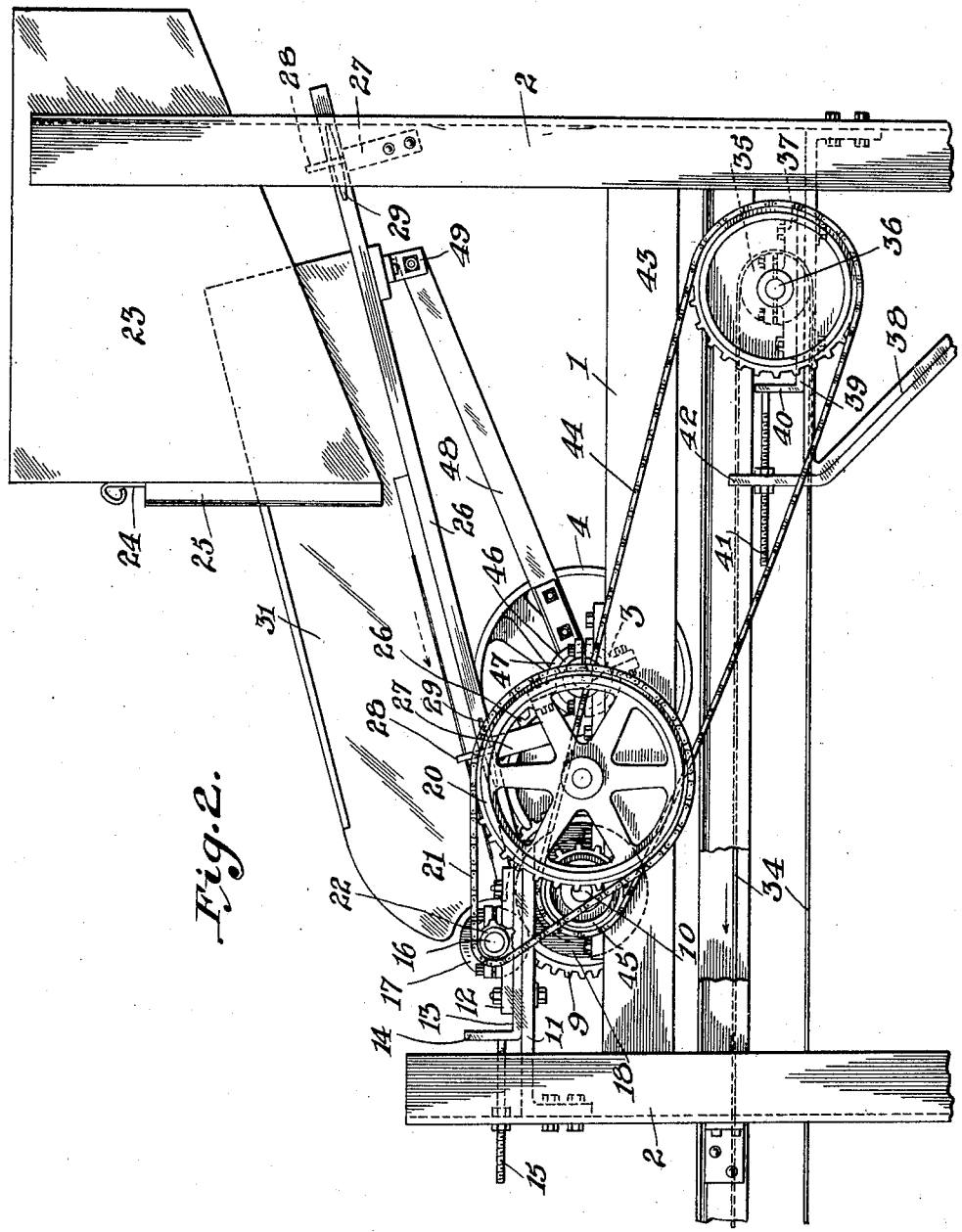

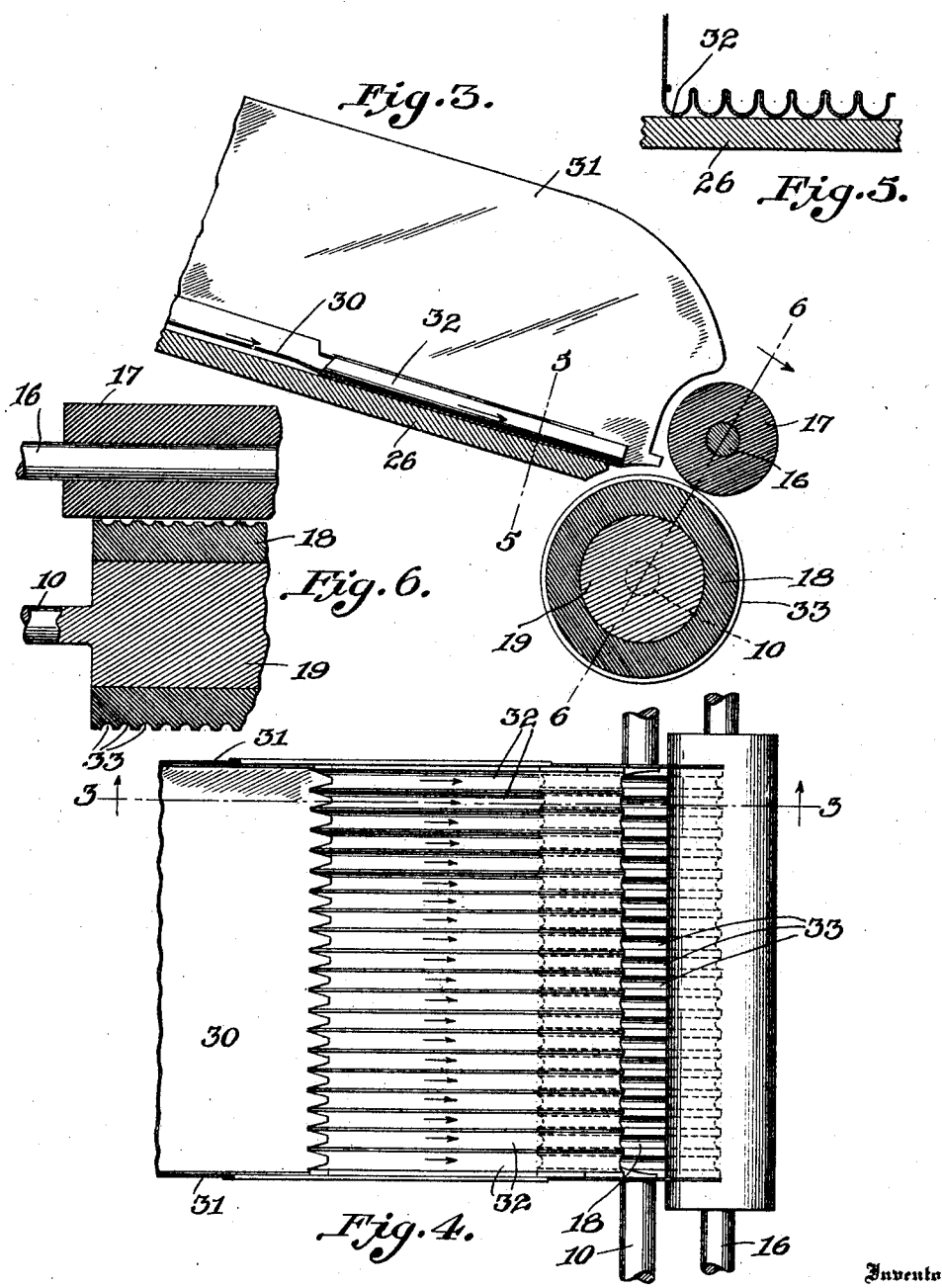

UNITED STATES PATENT OFFICE.

THOMAS SANGIULIANO, OF WILKES-BARRE, PENNSYLVANIA.

NUT-BLANCHING MACHINE.

1,393,168. Specification of Letters Patent. Patented Oct. 11, 1921.

Application filed December 28, 1920. Serial No. 433,601.

*To all whom it may concern:*

Be it known that I, THOMAS SANGIULIANO, a citizen of the United States, residing at Wilkes-Barre, in the county of Luzerne and State of Pennsylvania, have invented certain new and useful Improvements in Nut-Blanching Machines; and I do hereby declare the following to be a full, clear, and exact description of the invention, such as will enable others skilled in the art to which it appertains to make and use the same.

This invention relates to new and useful improvements in nut blanching machines and more particularly to the removal of the skins from the kernels of peanuts, the main object of the invention being the provision of a machine capable of effectively removing the skins from roasted or otherwise cooked peanut kernels without harm to the body of the kernel and to perform such operations upon a commercial scale without causing separation of the kernel into its component halves, which separation produces the condition known as splits which are very undesirable for the commercial product.

Another object of the invention is the provision of a nut blanching machine provided with a feeding mechanism which feeds the kernels into suitable channels on a revolving roll where the kernels are brought into contact with what is known as the removing roll which revolves at a high rate of speed wherein the skins from the kernels will be quickly and readily removed and the kernels and skins will be dropped down to a conveyer belt where they will be conveyed to a machine for separating the loose skins from the kernels.

With the above and other objects in view the invention consists in the novel features of construction, combination and arrangement of parts hereinafter more fully set forth, pointed out in the claims and shown in the accompanying drawings in which:

Figure 1 is a side elevation of a nut blanching machine constructed in accordance with my invention;

Fig. 2 is a similar view taken from the opposite side of the machine;

Fig. 3 is a detail longitudinal sectional view;

Fig. 4 is a top plan view of the feeding chute and the rolls;

Fig. 5 is a detail transverse section taken on the line 5—5 of Fig. 3; and,

Fig. 6 is a detail section taken on the line 6—6 of Fig. 3.

Referring now more particularly to the drawings it will be noted that the machine is suitably supported upon longitudinal base beams 1 which are in turn supported in spaced relation with the surface upon which the machine is mounted by means of the spaced uprights 2. The machine itself consists of a main driving shaft 3 having mounted upon one end thereof a pulley 4, the driving shaft being extended transversely across the beams 1 and mounted within suitable bearings. The shaft 3 supports a pinion 5 which is adapted to mesh with a gear 6 mounted upon one end of a transverse shaft 7 whereby movement will be imparted to the shaft 7 through the medium of the pinion 5 and the gear 6.

Mounted upon one end of the shaft 7 and arranged adjacent the gear 6 is a pinion 8 meshing with a gear 9 mounted upon a transverse shaft 10 preferably disposed parallel with the shafts 5 and 7 and mounted in suitable bearings upon the beams 1. It will be noted from the above connection that the shaft 10 will be rotated at a relatively slow rate of speed.

Mounted upon the longitudinally extending arms 11 are the adjustable bearings 12, said bearings being mounted upon the sliding plate 13 having an upturned end 14 with which the screw bolt 15 is engaged for adjusting the plate 13 longitudinally upon the arms 11. Mounted within the bearing 12 is a transverse shaft 16 disposed in an inclined position with respect to the shaft 10 and carries a roller 17 arranged between the spaced arms 11 and adapted to contact with the exterior surface of a second roller 18 which is mounted upon the shaft 10. The cover portion of the roller 18 is preferably formed of rubber or other yieldable material as illustrated in Figs. 3 and 6 and mounted upon a drum 19.

In order to impart movement to the roller 17, a sprocket wheel 20 is mounted upon the end of the shaft 7 opposite the gear 6 and connected by means of a chain 21 to a sprocket 22 mounted upon one end of the shaft 16. It will be noted in the drawings that the diameter of the sprocket 20 is several times that of the sprocket 22 so that during operation, the roller 17 will be rotated at a relatively high rate of speed in comparison with the speed of the roller 18.

Mounted above the beams 1 and supported upon the upper ends of the uprights 2 at one end of the machine is a hopper 23 having an inclined bottom wall and further provided with an opening at the lower edge of the bottom to permit discharge of the contents of the hopper. This opening in the hopper is normally closed by means of a sliding plate 24 mounted within suitable guides 25 whereby the plate 24 can be raised and adjusted to regulate the flow of the contents of the hopper therefrom.

Arranged beneath the hopper and disposed in an inclined position is a movable platform 26, the ends of which are supported by means of the transverse bars 27 having guide pins 28 arranged at each end and between which the platform 26 is adapted to move over the upper edges of the bars 27. In order to eliminate unnecessary wear on the platform 26 suitable plates 29 are attached to the edges of the platform and disposed in a position to contact directly with the guides 28.

Mounted upon the platform 26 is a trough member including a bottom portion 30 resting directly upon the upper face of the platform 26 and provided upon its longitudinal edges with the side walls 31, the upper end of the trough being movable within the hopper as clearly illustrated in Figs. 1 and 2. The lower end of the bottom member 30 is provided with a plurality of parallel channels as shown at 32 whereby to guide the nut kernels downwardly into the respective grooves of the roller 18. It will be noted in Fig. 6 that the yieldable cover portion of the roller 18 is provided with a plurality of circumferential grooves 33 and the channels 32 are preferably arranged so that the lower end of each of the channels communicates directly with one of the grooves 33 in the roller 18 so that the nut kernels passing down the channels 32 will be deposited within the grooves 33, the relatively rotary movement of the roller carrying the kernels between the rollers 17 and 18 and as the roller 17 is traveling at a high rate of speed with respect to the roller 18 the greater portion of the skins will be readily removed from the kernel so that as the kernel drops downwardly unto the conveyer belt 34 the remaining portion of the skins will readily be released from the kernel.

It will be noted that the conveyer belt 34 passes directly beneath the rollers 17 and 18 so that after the kernels have passed between the rolls they will readily drop onto the conveyer belt and be conveyed to a separating machine or any desired receptacle. The conveyer belt 34 is adapted to pass around a roller 35 mounted upon a shaft 36, the ends of which are supported within suitable bearings 37 arranged upon the spaced brackets 38. These brackets 38 are bolted or otherwise secured to the standards 2 at the rear of the machine and disposed beneath the beams 1. In order to take up or release the slack in the conveyer belt 34 the bearings 37 are mounted upon movable plates 39, one end of each of said plates extending upwardly at right angles as shown at 40 and connected thereto are the adjustable screw members 41 which are threaded through an upright member 42, said screw members having a nut disposed upon opposite sides of the upright 42 whereby the bearings 37 can be readily adjusted longitudinally along the upper face of the brackets 38.

In order to impart movement to the conveyer belt 34 a sprocket 43 is mounted upon one end of the shaft 36 and connected by means of a chain 44 to a sprocket 45 mounted upon the end of the shaft 10 opposite the gear 9. From this it will be apparent that when the rolls 17 and 18 are in operation, movement will be readily imparted to the conveyer belt 34.

In order to provide a reciprocating movement to the platform 26, the cam member 46 is mounted upon the central portion of the shaft 3 and rotates within a sleeve 47 secured to the lower end of the connecting rod 48, the other end of said rod being loosely connected to the lower side of the platform 26 as shown at 49. From this it will be apparent that upon rotation of the shaft 3, the cam member 46 will rotate within the sleeve 47 and impart a reciprocating movement to the rod 48 which in turn will convey this movement to the platform 26, the reciprocating movement of the platform 26 conveying the nut kernels downwardly through the channels 32 and at the same time assist in conveying them from the hopper 23 and separating them so that equal amounts will tend to travel downwardly through the channels 32.

From the above description taken in connection with the accompanying drawings it will be readily apparent that I have provided a blanching machine for removing the skins from nut kernels which is extremely simple in its construction and equally effective in its operation, it being understood that the bulk kernels are placed within the hopper 23. Power is then applied to the pulley 4, said pulley being driven from any suitable source whereby to impart movement to the shafts 5, 7 and 10 through the several pinions and gears which in turn will impart a rotary movement to the rollers 17 and 18 and at the same time impart reciprocating movement to the platform 26 to convey the nut kernels from the hopper 23 into the grooves 33 formed in the roller 18 and the nut kernels passing beneath the roller 17 which is rotated at a relatively high rate of speed with respect to the roller 18 so that a sufficient portion of the skin of the kernel will be removed, the remaining portions of the skin being released from the kernel as it strikes the conveyer belt 34.

It will be noted that by having the rollers 17 and 18 formed of a yieldable material, the nut kernels will readily pass between the rollers and the skins removed therefrom without having sufficient pressure applied thereto to cause the kernels to be separated into their component halves and thus reduce the quantity of splits generally derived during the blanching of the kernels.

I claim as my invention:

1. A nut blanching machine including superimposed rolls having yieldable contacting surfaces, one of said rolls being provided with circumferential grooves and the other roll disposed in an inclined position and rotated at a higher rate of speed, a reciprocating member having a plurality of channels communicating at one end directly with the grooves in one of said rolls whereby to direct the nut kernels into the grooves, the rotation of the rolls carrying the kernels between the rolls whereby the rapid rotation of one of said rolls will remove the skins therefrom.

2. A nut blanching machine including a pair of rolls arranged one above the other, one of said rolls having circumferential grooves in its surface and both of said rolls being provided with yieldable contacting surfaces, means for rotating said rolls at different rates of speed, means for adjusting one of said rolls to regulate the pressure between the two rolls, a reciprocating platform disposed in an inclined position at one side of the rolls, a hopper arranged above the platform, means for regulating the feed of nut kernels from the hopper unto the platform, said platform having a plurality of channels arranged thereon communicating at one end with the grooves in the roll whereby the nut kernels will be conveyed directly into the grooves and passed between the two rolls whereby the rapid rotation of one of said rolls will remove the skins therefrom.

3. A nut blanching machine including a pair of rolls having yieldable contacting surfaces, one of said rolls being provided with circumferential grooves, reciprocating means for feeding the nut kernels into the grooves of said roll, means for rotating said rolls at different rates of speed whereby the nut kernels passing between the rolls will have the skins removed therefrom and a conveyer belt movable beneath the rolls to remove the blanched kernels.

4. A nut blanching machine including a pair of rolls having yieldable contacting surfaces, one of said rolls being provided with annular grooves and the other of said rolls with a smooth unbroken surface, means for rotating said rolls and means whereby the smooth surfaced roller is rotated at a higher rate of speed than the grooved roller.

5. A nut blanching machine including superimposed rolls having yielding contacting surfaces, one of said rolls being provided with circumferential grooves and the other roll arranged in an inclined position with respect to the grooved roll and having a smooth surface, means for rotating the second roll at a relatively higher rate of speed, and means for feeding nut kernels into the grooves whereby the rapid rotation of the second roll will remove the skins therefrom.

In testimony whereof I affix my signature.

THOMAS SANGIULIANO.